United States Patent Office 3,094,493
Patented June 18, 1963

3,094,493
STABILIZING NOBLE METAL CATALYST
William G. Nixon, Westchester, Ill., assignor to Universal
Oil Products Company, Des Plaines, Ill., a corporation
of Delaware
No Drawing. Filed Dec. 10, 1959, Ser. No. 858,561
4 Claims. (Cl. 252—466)

The present invention, in its broad aspect, relates to processes for manufacturing noble metal-containing catalytic composites. More specifically, the invention is directed toward an improvement in such processes, and particularly in those processes for manufacturing a catalyst comprising a noble metal component combined with a refractory inorganic oxide, especially a platinum-alumina composite. The utilization of the method of the present invention results in a noble metal catalyst of increased stability; that is, increased capability of performing its intended function for an extended period of time.

Catalytic composites have attained extensive commercial utility, and industries such as the pharmaceutical, detergent, petroleum, insecticidal, etc., utilize metal-containing composites to promote a multitude of reactions. The most common reactions, promoted by catalytic composites, are hydrogenation, cyclization, cracking, polymerization, dehydrogenation, alkylation, and isomerization. Regardless of the industry and/or the particular reaction or reactions affected therein, it is extremely essential for commercial acceptability that the particular catalyst employed exhibits a high degree of activity, with respect to the reaction to be promoted, and an equally high degree of stability, in regard to the capability of the catalyst to function acceptably, for an extended period of time.

The method of manufacturing the catalyst of the present invention is especially advantageous in regard to processes for the catalytic reforming of hydrocarbons and mixtures of hydrocarbons. Such processes find widespread use in the petroleum industry wherein it is highly desirable to produce high quality motor fuel in large quantities from various hydrocarbon fractions and distillates. It is well known that the great majority of catalytic processes employ a noble metal-containing catalytic composite, and especially a catalyst comprising platinum. In the interest of simplicity, the following discussion is limited to those catalysts containing platinum; it is understood, however, that catalytic composites containing other noble metals can be improved through the use of the present invention, and it is not intended to unduly limit the scope of the present invention to catalysts containing only platinum. Other noble metals which can be employed in a catalytic composite, and ultimately improved through the use of the present invention include palladium, iridium, rhodium, rhenium, ruthenium, mixtures of two or more, etc. For the purpose of imparting certain desired physical and/or chemical characteristics to the noble metal-containing catalytic composite, other metals may be added thereto; such other metals include cesium, lithium, and other alkali metals, tungsten, chromium, vanadium, nickel, and other metals of groups VI and VIII of the periodic table. The metal component may exist either in the elemental state or in combination such as the halide, oxide, nitrate, sulfate, sulfide, etc. Regardless of the precise physical and/or chemical make-up of the catalytic composite, the activity and stability of the noble metal contained therein will be advantageously affected through the use of the present invention.

Similarly, regardless of the particular noble metal, or the existence of other metal components within the catalytic composite, the metallic components are generally composited with a highly refractory inorganic oxide material. The most common refractory oxide material employed as the carrier material in the manufacture of such catalytic composites, is alumina. However, other refractory oxides, including silica, zirconia, magnesia, boria, thoria, strontia, titania, etc., and mixtures of two or more including silica-alumina, alumina-boria, silica-alumina-zirconia, etc., may be employed. As hereinabove stated, the precise composition of the catalytic composite, to be improved through the method of the present invention, is not an essential limitation thereof.

The object of the present invention is to increase the stability of the noble metal component within a catalytic composite by a method which increases the crystal size (as measured in Angstrom units) of such noble metal component. An obvious additional advantage is realized since the activity of a catalyst containing metals having an increased crystal size, is also increased.

In its broad aspect, the present invention relates to a method for manufacturing a noble metal-containing catalytic composite which comprises impregnating a refractory inorganic oxide with said noble metal, drying the impregnated inorganic oxide, contacting the resultant dried composite with gaseous ammonia at an elevated temperature sufficient to increase the crystal size of said noble metal and thereafter calcining the ammonia-treated catalytic composite.

In a somewhat more limited embodiment, the present invention affords a method for manufacturing a platinum-alumina catalytic composite which comprises impregnating alumina with a platinum compound, drying the impregnated alumina and contacting the resultant dried composite with gaseous ammonia at a temperature within the range of about 300° to about 700° C., thereby increasing the crystal size of said platinum.

In another embodiment, the present invention is directed toward an improvement in processes for manufacturing a noble metal-containing catalytic composite, by which processes the noble metal of the final catalytic composite has a crystal size less than about 50 Angstroms, which improvement comprises contacting said composite with gaseous ammonia at an elevated temperature sufficient to increase the crystal size of said noble metal to above about 80 Angstroms.

In a specific embodiment, effected upon a platinum-containing catalyst wherein the platinum has a crystal size less than about 50 Angstroms, the improvement of the present invention comprises impregnating alumina with a platinum compound, drying the impregnated alumina and thereafter contacting the dried composite with gaseous ammonia at a temperature within the range of about 300° C. to about 700° C. thereby increasing the crystal size of said platinum to a level of about 100 to about 150 Angstroms.

The exact nature of the phenomenon, effected through the action of dry gaseous ammonia, whereby a significant change in the crystal size of the platinum metal, existing in some combined state with the other components of the catalytic composite, is not known precisely. It has been found, as hereinafter indicated, that the treatment with gaseous ammonia yields a platinum crystal as much as five times as large as that crystal obtained by any of the well-known methods of catalyst manufacture. The increased size in the platinum crystal is obtained whether the catalyst is first prepared by a suitable, well-known method and subsequently treated with dry gaseous ammonia, or the ammonia treatment is made on integral portion of such method. In accordance with the method of the present invention, the impregnated inorganic oxide is contacted with gaseous ammonia after the impregnated inorganic oxide has been subjected to drying, and prior to calcining the same at an elevated temperature in an atmosphere of air. Beneficial results are also obtained, through the use of dry gaseous ammonia in those instances where the high temperature calcination precedes the ammonia treatment. An essential feature of the present invention, involving the use of gaseous ammonia, is to eliminate as far as possible, the presence of moisture during the ammonia treatment. Further, it appears that more beneficial results are obtained in a non-reducing atmosphere, and particularly in an atmosphere which is substantially completely free from hydrogen. This is not intended, obviously, to preclude the use of ammonia itself, although ammonia may, in other instances, be considered a reducing agent. A non-reducing atmosphere is intended to denote an atmosphere substantially completely devoid of the well-known gaseous reducing agents such as hydrogen, methane, ethane, carbon monoxide, etc. The length of the treatment with gaseous ammonia, as well as the concentration or total quantity, of ammonia passing through the impregnated composite, is dependent upon the quantity of material to be so contacted, the particular means by which the dry gaseous ammonia is dispersed throughout the material, and the particular size of platinum crystal which is ultimately desired. The determination of the quantity of ammonia ultimately employed in any given instance, can be carried out readily by one skilled in the art when the above aspects are taken into consideration. It appears, however, that there exists a finite stage, during the period of contact with gaseous ammonia, at which the maximum increase in crystal size has been effected. Any further treatment with ammonia would not be economically feasible, and no particular advantage in utilizing an excess thereof appears to be foreseeable.

As hereinafter indicated, the presently utilized methods of manufacturing a platinum-containing catalyst, results in a final composite containing platinum having a crystal size of about 30 to about 35 Angstroms. It is a rare occasion when these manufacturing procedures result in a catalytic composite in which the platinum has a crystal size as high as 50 Angstrom. Through the utilization of the method of the present invention, the platinum-containing catalyst, regardless of the particular method of preparation and also regardless of the particular refractory oxide employed as the carrier material, will produce a final catalyst in which the platinum possesses a crystal size in excess of 80 Angstroms. It is not unusual for the method of the present invention to result in platinum metal having a crystal size within the range of about 100 to about 150 Angstroms.

Generally, the quantity of the metallic component combined with the refractory oxide material, such as alumina, is small compared to the quantity of the other components combined therewith. For example, the noble metal, and particularly platinum and/or palladium, will generally comprise from about 0.01% to about 5% by weight of the total catalyst, and more usually from about .1% to about 1% by weight thereof. The use of the other metallic components hereinbefore described, are dependent upon the particular use for which the catalyst is maintained. In any event, however, the concentrations of the metallic components will be small, and will generally be within the range of about 0.1% to less than about 10% by weight of the total catalyst.

In addition to the platinum and alumina, the catalyst generally comprises combined halogen. The concentration of the halogen, usually selected from the group of fluorine and chlorine, is within the range of about 0.01% to about 8% by weight, calculated as the element. Fluorine appears to be less easily removed from the catalyst during the process in which the catalyst is employed, and therefore is preferred in many instances. Since the halogen is believed to be combined with one or more of the other components of the catalyst, it is generally referred to as combined halogen, but is calculated as the element thereof.

As hereinbefore set forth, the catalyst may be prepared in any suitable manner, and may have any particularly desired component composition. The catalyst may take the form of spheres, pills, powder, granules, etc.; it may be prepared in any manner including separate, successive, or co-precipitation methods; the various components may be combined with each other in any desired manner; and, various reagents may be added during the manufacturing process without removing such a composite from the broad scope of the present invention. Briefly, the method of the present invention, where the ammonia treatment is made an integral portion of the manufacturing process, is first to combine those components which will ultimately remain on the catalyst. Thus, an alumina carrier material containing combined chlorine and fluoride is impregnated with an aqueous solution of a suitable water soluble platinum compound such as chloroplatinic acid. The thus impregnated carrier material is dried at a temperature within the range of about 200° F. to about 400° F., and thereafter contacted with a stream of dry gaseous ammonia at a temperature within the range of 300° C. to about 700° C. The treatment with ammonia may be effected with the catalyst disposed in a fixed bed, the ammonia contacting the catalyst in upflow, downflow, or crossflow; the catalyst may be placed on a moving belt and the ammonia passed therethrough, in concurrent or countercurrent flow; or, the catalyst may be transported through a fixed ammonia atmosphere. The ammonia treated catalyst is subsequently calcined at an elevated temperature within the range of about 700° to 900° C., and in an atmosphere of air.

The following examples are given for the purpose of further illustrating the method of the present invention, and to indicate more clearly the benefits afforded through the utilization thereof. It is not intended to limit unduly the scope of the present invention to the particular reagents, processing conditions and/or concentrations employed within the examples. Insignificant modifications, within the scope and spirit of the appended claims will become readily apparent to those skilled in the art of catalyst manufacture, and particularly in the art of manufacturing noble metal-containing catalytic composites.

The catalytically active carrier material employed in the following examples consisted of alumina containing combined fluoride and chloride. This composite was prepared by the well-known oil-drop method from a mixture of equal volumes of a 28% by weight solution of hexamethylenetetramine in water and an aluminum chloride hydrosol containing 12% by weight of aluminum and 10.8% by weight of combined chloride. The fluoride was added by way of an aqueous solution of hydrogen fluoride and the mixture formed into hydrogel spheroids. The spheres were washed, dried and calcined to a temperature of 650° C.

*Example I*

A 130-gram portion of the calcined alumina-combined halogen spheres was commingled with 99 milliliters of an aqueous solution of chloroplatinic acid containing 10 milliliters of platinum per milliliter, plus 60 milliliters of water. The mixture was evaporated to dryness over a water bath at a temperature of 99° C., and further dried in a rotary drier to a temperature of 200° C. for a period of 3 hours. The composite was thereafter subjected to a calcination treatment, in the presence of air at a temperature of 500° C., for a period of 1 hour. When analyzed by X-ray defraction, the catalyst indicated that the metallic platinum had an average crystal size of about 30 to about 35 Angstroms.

A portion of the calcined impregnated catalyst was subjected to a treatment with ammonia gas, diluted only with nitrogen, at a temperature of 500° C. for a period of about 15 minutes. The analysis by X-ray defraction indicated that the crystal size of the platinum had been increased to a level of about 80 Angstroms.

*Example II*

A second catalyst was prepared utilizing 99 milliliters of chloroplatinic acid solution as described in Example I. The impregnated composite was dried over a water bath, and further dried in the rotary drier at a temperature of 200° C. The dried catalyst was placed in a Pyrex glass tube, and the temperature thereof brought to 200° C. Gaseous ammonia was passed through a suitable desiccant, to remove any existing moisture, and passed through the catalyst while the temperature thereof was increased to about 500° C. This ammonia treatment was effected for a total period of about one hour. The thus ammonia-treated catalyst was then subjected to calcination in an atmosphere of air for a period of about 2 hours at a temperature of 500° C. The analysis by X-ray defraction indicated that the platinum crystal size was within the range of 100 to 150 Angstroms, there being no indication of a size less than 100 Angstroms.

The foregoing examples clearly indicate the method of the present invention, and the benefits afforded through the utilization thereof. A catalyst possessing a greater degree of stability has been produced by increasing the crystal size of the metallic component existing therein. Thus, the unusually high activity of ammonia-treated noble metal catalysts may be advantageously utilized for an extended period of time.

I claim as my invention:

1. In a process for manufacturing a platinum-alumina catalytic composite, wherein the platinum has a crystal size less than about 50 Angstroms, the improvement which comprises contacting said composite at a temperature within the range of about 300° C. to about 700° C. with sufficient gaseous ammonia to increase the crystal size of said platinum to a level in excess of about 80 Angstroms.

2. The process of claim 1 further characterized in that the crystal size of said platinum is increased to a level within the range of about 100 to about 150 Angstroms.

3. In a process for manufacturing a platinum-alumina catalytic composite, wherein the platinum has a crystal size less than about 50 Angstroms, the improvement which comprises impregnating alumina with a platinum compound, drying the impregnated alumina, thereby forming a composite containing platinum of a crystal size less than about 50 Angstroms, and contacting the dried composite at a temperature within the range of about 300° C. to about 700° C., with sufficient gaseous ammonia to increase the crystal size of said platinum to a level of about 100 to about 150 Angstroms, and thereafter calcining the platinum-alumina composite at an elevated temperature in an atmosphere of air.

4. The process of claim 3 further characterized in that said dried composite is contacted with the gaseous ammonia in the absence of hydrogen.

References Cited in the file of this patent

UNITED STATES PATENTS

| | | |
|---|---|---|
| 2,209,458 | Heard et al. | June 30, 1940 |
| 2,479,884 | West et al. | Aug. 23, 1949 |
| 2,746,909 | Hemminger | May 22, 1956 |
| 2,814,650 | Clark | Nov. 26, 1957 |
| 2,911,451 | Haensel | Nov. 3, 1959 |
| 2,968,635 | Nixon | Jan. 17, 1961 |